B. P. MERRY.
ANIMAL MUZZLE.
APPLICATION FILED JULY 3, 1911.

1,042,022.

Patented Oct. 22, 1912.

Witnesses
R. C. Claflin
Allan Hobson

Inventor
Benjamin P. Merry
By Edson Bros, Attorneys

COLUMBIA PLANOGRAPH CO., WASHINGTON, D. C.

UNITED STATES PATENT OFFICE.

BENJAMIN P. MERRY, OF STRYKER, OHIO.

ANIMAL-MUZZLE.

1,042,022.  Specification of Letters Patent.  Patented Oct. 22, 1912.

Application filed July 3, 1911. Serial No. 636,772.

*To all whom it may concern:*

Be it known that I, BENJAMIN P. MERRY, a citizen of the United States, residing at Stryker, in the county of Williams and State of Ohio, have invented certain new and useful Improvements in Animal-Muzzles; and I do hereby declare the following to be a full, clear, and exact description of the invention, such as will enable others skilled in the art to which it appertains to make and use the same.

My invention relates to animal muzzles especially designed as a weaner. The muzzle may also be used to advantage on cows for preventing them from milking themselves.

The principal object of my invention is to provide an improved muzzle of this kind which may be adjusted to fit animals having heads of different sizes and shapes without impairing the usefulness of the device.

A further object is to provide adjustable means for engaging the head of the animal.

Another object is to support the weaning device in front of the nose of the animal in such a manner that it may be moved upward to a limited extent so as not to interfere with the proper feeding of the animal, but cannot be raised beyond the point where it will fall again by gravity.

Further objects will become apparent from the following description.

The invention consists in the features of construction and combinations of parts hereinafter explained, illustrated in the accompanying drawing, and specified in the appended claims.

Figure 1:
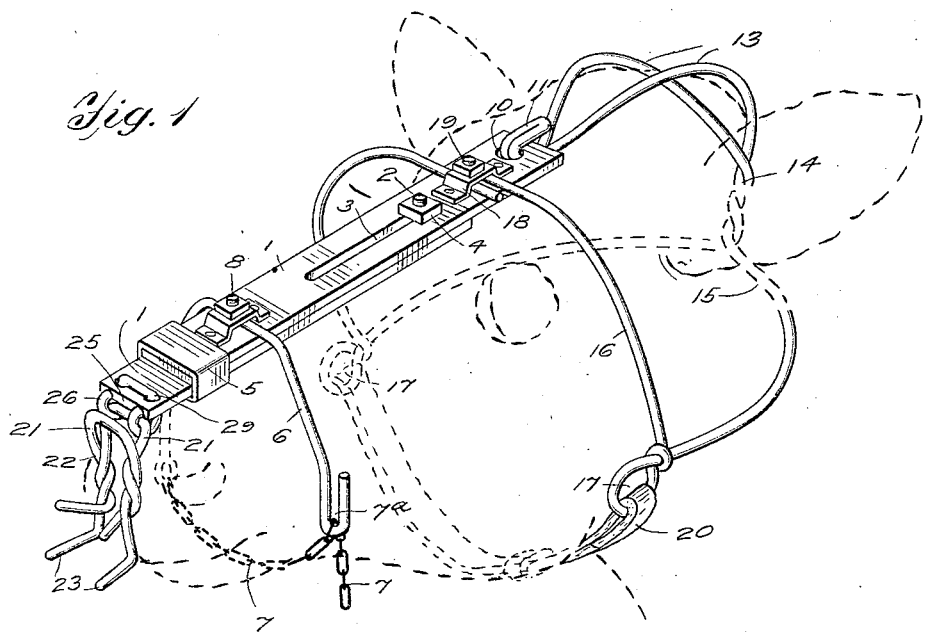
Figure 2:
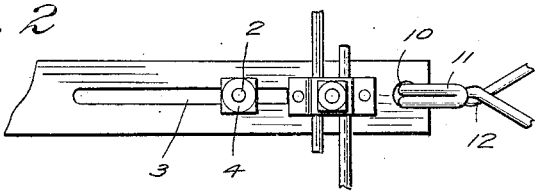
Figure 3:
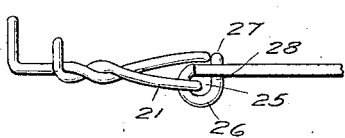
Figure 4:
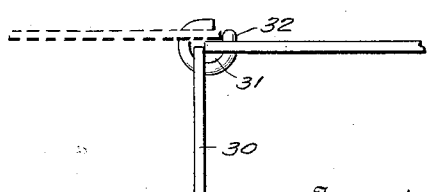

In the accompanying drawing: Figure 1 is a perspective view of the muzzle adjusted to a calf's head shown in dotted lines, a novel weaner made of bent wire being attached to the muzzle. Fig. 2 is an upper plan view of the muzzle showing how the head engaging part is adjustable. Fig. 3 is a detailed side view of the lower end of the longitudinal bar showing the weaner in its farthest raised position, and Fig. 4 is a similar view showing a plate weaner, the raised position thereof being illustrated in dotted lines.

Referring more particularly to the drawing, 1 designates the longitudinal bar or strip which is made in two sections, one having a screw-threaded stud or bolt 2 at one end, and the other having a longitudinal slot 3 adapted to engage said stud for the purpose of varying the length of said bar to adjust it to animals' heads of different sizes. The two parts of the longitudinal bar are secured together by a nut 4 screwed upon the projecting end of the stud 28 and further by a metal loop 5 rigidly secured on the end of the perforated part and loosely engaging the other part of the bar.

A curved or bowed piece 6, of resilient wire or metal, is fastened at its center to the bar 1 a short distance from its lower end. The arms of said bowed strip are resilient whereby they may be bent to conform to the nose of the animal. It will be seen that said bowed piece, when engaged with the animal's nose, will retain the longitudinal bar 1 in the center of the animal's face. To one end of said bowed piece there is rigidly attached a chain or band 7 also adapted to be detachably secured to a hook 7ª formed on the other end of the piece 6. This chain or band extends below the animal's jaw and holds the bar 1 down firmly in place. Furthermore, said chain or band is made long enough to allow for various adjustments to fit different sizes of heads. As illustrated, the bowed piece 6 is secured to the bar 1 by means of a bolt 8 and clamping plate 9, but any other suitable fastening means may be used, if preferred.

The upper end of the bar 1 is formed with a perforation 10 engaging a hook 11 on the head-engaging piece of the muzzle. Said head-engaging piece is preferably made of a single piece of stout self-sustaining wire folded upon itself at the center where the hook 11 is formed, and having its two portions or strands twisted together at 12 adjacent to the hook, thence spread apart forming a bent loop 13 adapted to fit the top of the animal's head between his ears or horns, thence twisted together again at 14, thence spread apart once more to form large loops adapted to pass around the ears or horns. Portions 15 of the wire, forming said last mentioned loops, extend downwardly and forwardly, while other portions 16 of the same extend forwardly and upwardly, small rings 17 being formed where the direction of the parts is changed. The extremities of the forwardly and upwardly extending portions of the strands of wire are arranged below a clamping plate 18 secured upon the main portion of the bar 1 by a bolt 19. These extremities may be adjusted below the clamping plate when the bolt 19 is loosened, thereby varying the width of the head-engaging piece to fit heads of different sizes. An adjustable band or strap 20 is attached to the small rings 17 and is passed under the animal's neck for holding the muzzle securely in place.

The weaner, shown in Fig. 1, consists of two looped straps or bent wires 21 and 22, of similar size, having their arms twisted about one another, and the extremities of said arms bent outward at different angles forming pricklers 23. The upper looped portions of said strips are spaced apart, as at 24. The looped portion of the lower strip 21 is engaged by the eyes 25 of a hinge 26 which permits the weaner to be thrown upward to a limited extent but arrests the looped portion of the upper strip 22, as illustrated in Fig. 3, before the weaner reaches a point beyond which it would not drop back again into normal position by gravity. This hinge consists of a looped strip 27 having its arms 28 passed through perforations 29 in the end of the bar 1 and then bent upward to form the eyes 25 extending in parallel planes with their ends terminating adjacent to the extremity of the bar. The loop proper of the strip 27 is arranged above the bar 1, and the eyes formed by the bent arms thereof are of sufficient diameter to permit the looped portion of the lower strip 21 of the weaner to swing freely therein.

As illustrated in Fig. 4, a plate weaner 30 may be used instead of the prickler weaner 20, if desired. Said plate is attached to the front end of the bar 1 by a hinge constructed similarly to that described in connection with the prickler weaner, the eyes 31 of said hinge being passed through perforations 32 in the upper edge of said plate. The diameter of the eyes is substantially equal to the width of the edge of the weaner plate from said perforations upward, which is engaged by said eyes. By reason of this construction, the upward movement of the plate is limited by its coming in contact with the extremity of the longitudinal bar, as illustrated in dotted lines, before said plate has been raised far enough to prevent its automatic return by gravity.

It is obvious that the muzzle shown and described herein may be used for various species of animals, including colts and dogs, as well as cows and calves. It is also understood that I reserve the right to make such detail changes in the structures herein shown and described as fairly fall within the scope of the appended claims.

I claim:

1. In a muzzle of the character described, the combination, with a longitudinally adjustable longitudinal bar, of a laterally adjustable head-engaging piece attached to the upper end of said bar and having self-sustaining loops adapted to pass around the ears or horns of an animal, and a self-sustaining loop adapted to fit upon the top of the head between the ears or horns, means for securing the muzzle to an animal's head, and a weaner on the end of said longitudinal bar.

2. In a muzzle of the character described, the combination, with a longitudinally adjustable longitudinal bar, of a laterally adjustable head-engaging piece attached to the upper end of said bar and having self-sustaining loops adapted to pass around the ears or horns of an animal, and a self-sustaining loop adapted to fit upon the top of the head between the ears or horns, said head-engaging piece having pivotal connection with said longitudinal bar for the purpose specified, means for securing the muzzle to an animal's head, and a weaner on the end of said longitudinal bar.

3. In a muzzle of the character described, the combination, with a longitudinally adjustable longitudinal bar, of a laterally adjustable head-engaging piece attached to the upper end of said bar and having self-sustaining loops adapted to pass around the ears or horns of an animal, a self-sustaining loop, adapted to fit upon the top of the head between the ears or horns, an adjustable band attached to said head-engaging piece and passed below the animal's neck for the purposes specified and a weaner on the end of said bar.

4. In a muzzle of the character described, the combination, with an adjustable longitudinal bar, of a head-engaging piece attached to the upper end of said bar and having loops adapted to pass around the ears or horns of an animal, said head-engaging piece also having adjusting arms extending transversely to said bar, means to clamp said arms to the bar, means for securing the muzzle to an animal's head, and a weaner on the end of said longitudinal bar.

5. In a muzzle of the character described, the combination, with an adjustable longitudinal bar, of an adjustable head-engaging piece attached to the upper end of said bar and formed of a single piece of bent wire bent upon itself at the middle and twisted at different points to form a bent loop for fitting the top of an animal's head, lateral loops adapted to extend around the ears or horns of the animal, rings on said lateral loops, an adjustable band attached to said loops and passed below the animal's neck for securing said head-engaging piece in position and a weaner on the end of said bar.

6. In a muzzle of the character described, the combination, with an adjustable longitudinal bar, having a perforation near its upper end, of an adjustable head-engaging piece made of bent wire formed into a hook engaging the perforation in the bar, and also formed into loops adapted to extend around the ears or horns of the animal, means for securing said head-engaging piece in position and a weaner on the end of said bar.

7. In a muzzle of the character described, the combination, with a longitudinal bar and means to fasten it to an animal's head, of a weaner hung from the lower end of said bar by a hinge which permits said weaner to swing upward to a limited extent but prevents it moving upward beyond the point where it would not be automatically returned by gravity, said weaner comprising two looped strips having their arms twisted around one another and the extremities of said arms bent at different angles forming pricklers, the looped portion of said strips being spaced apart for the purpose specified.

8. In a muzzle of the character described, the combination, with a longitudinal bar and means to fasten it to an animal's head, of a weaner hung from the lower end of said bar by a hinge which permits said weaner to swing upward to a limited extent but prevents it moving upward beyond the point where it would not be automatically returned by gravity, said weaner comprising two looped strips having their arms twisted around one another and the extremities of said arms bent at different angles forming pricklers, the looped portion of said strips being spaced apart to receive the hinge which is attached to the lower looped strip, the looped portion of the upper strip being adapted to engage the end of the bar for limiting the upward movement of the weaner for the purpose specified.

In testimony whereof, I affix my signature, in presence of two witnesses.

BENJAMIN P. MERRY.

Witnesses:
  CARRIE MERRY,
  C. T. CAULKINS.

---

Copies of this patent may be obtained for five cents each, by addressing the "Commissioner of Patents, Washington, D. C."